United States Patent [19]

Syberg

[11] 4,372,505
[45] Feb. 8, 1983

[54] SUPERSONIC INLET HAVING VARIABLE AREA SIDEPLATE OPENINGS

[75] Inventor: Jan Syberg, Kent, Wash.

[73] Assignee: The Boeing Company, Seattle, Wash.

[21] Appl. No.: 104,477

[22] Filed: Dec. 17, 1979

[51] Int. Cl.³ .................................................. B64B 1/24
[52] U.S. Cl. .................................................. 244/53 B
[58] Field of Search ..................... 244/53 B, 53 R; 137/15.1, 15.2; 60/270 R

[56] References Cited
U.S. PATENT DOCUMENTS 3,302,657  2/1967  Bullock ............................. 244/53 B
3,430,640  3/1969  Lennard ............................ 137/15.1

Primary Examiner—Robert B. Reeves
Assistant Examiner—Gene A. Church
Attorney, Agent, or Firm—Ronald E. Suter; Bernard A. Donahue

[57] ABSTRACT

An inlet duct of generally rectangular configuration for supersonic aircraft in which a normal shock is produced in close proximity to the forward lip of the lower duct wall, and in which variable area sideplate openings are provided just upstream of the normal shock to achieve boundary layer control for the normal shock-boundary layer interaction during on-design operation and increasing flow area for spillage as the normal shock is moved forward during off-design operation.

6 Claims, 6 Drawing Figures

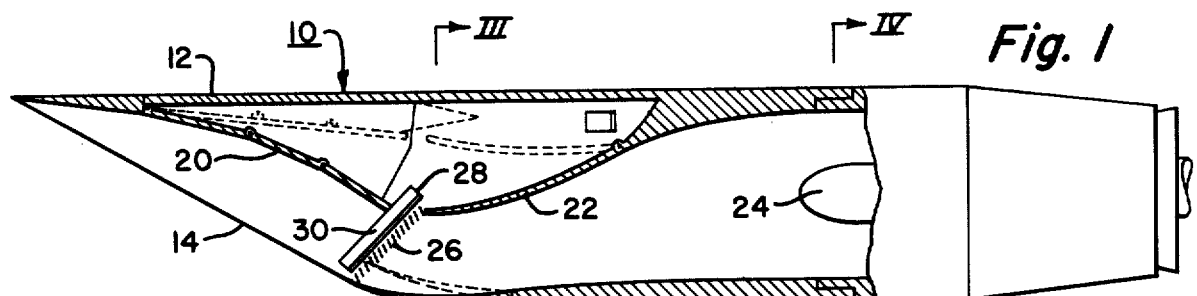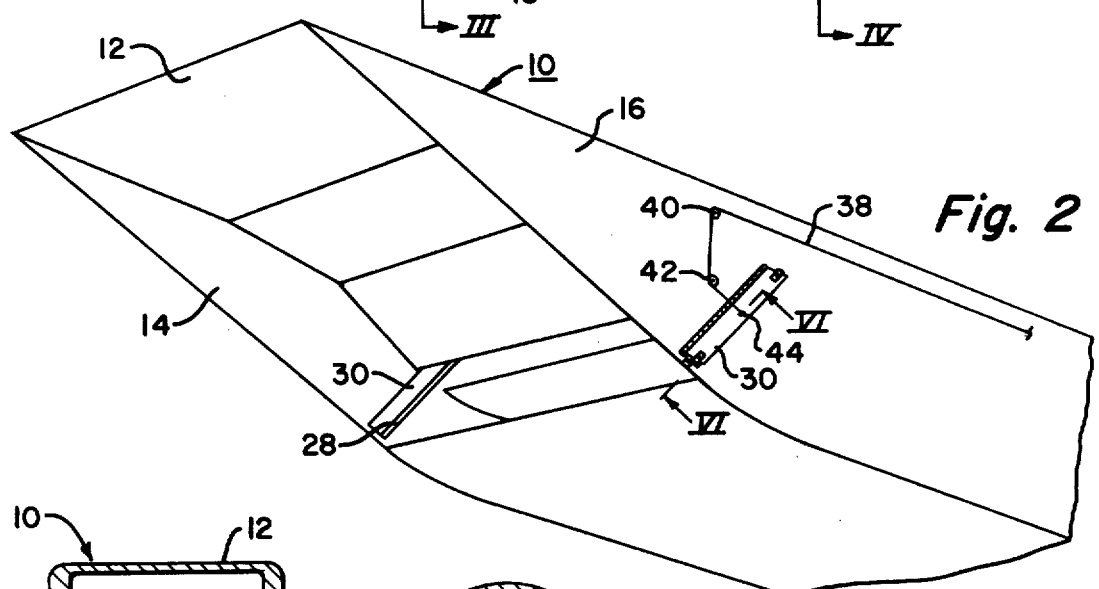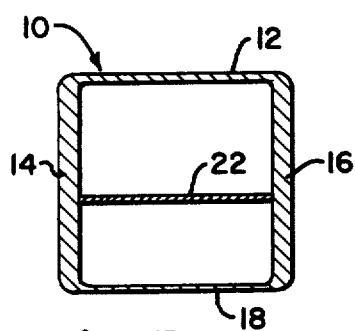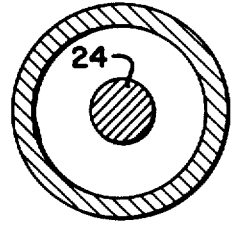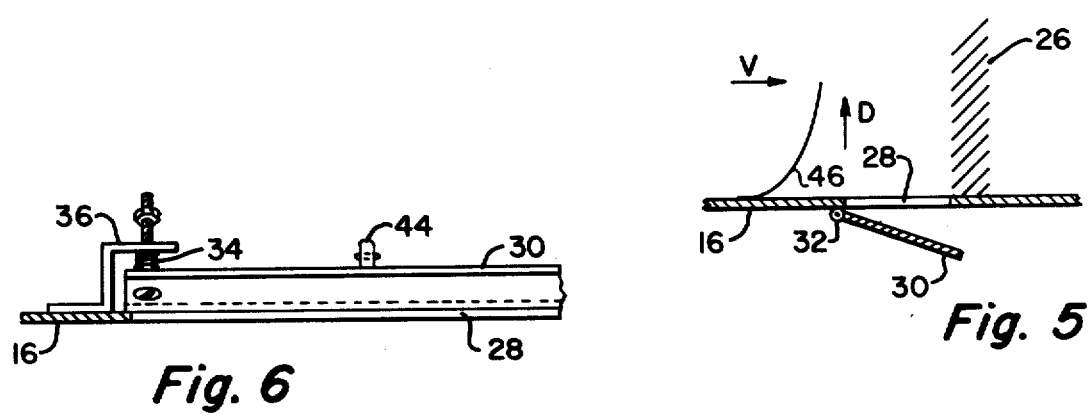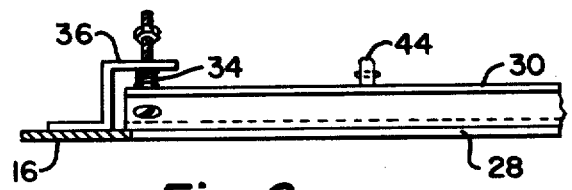

SUPERSONIC INLET HAVING VARIABLE AREA SIDEPLATE OPENINGS

BACKGROUND OF THE INVENTION

As is known, in supersonic aircraft, the compressors for the engines are incapable of accepting supersonic airflow. Consequently, the engine air inlet ducts for such engines must be designed to produce shock waves which reduce the velocity of the entering air to a subsonic level which can be accepted by the compressors. The shock waves comprise areas or boundaries at the intake where the velocity of the entering air decreases abruptly while its pressure increases. Successive decreases in velocity and increases in pressure bring the air down to a subsonic velocity where it can be accepted by the engine compressors.

Two-dimensional external compression supersonic inlets of this type typically consist of an external ramp system followed by a subsonic diffuser duct which reduces the velocity of the captured airstream from the free stream Mach number to the desired engine face Mach number. The external ramp system, which compresses the flow to a Mach number slightly above 1.0, is usually provided with sideplates to prevent spillage of the compressed airflow over the edges of the ramps. Compression from the low supersonic Mach number at the end of the external ramp system to subsonic flow is obtained through a normal shock (i.e., normal to the ramp and side walls) which typically is located just upstream of the lower lip of the subsonic diffuser duct. For off-design operation of the supersonic aircraft, it may be necessary to reduce the amount of flow captured by the inlet without changing the position of the external ramp system. This is accomplished by advancing the normal shock forward on the ramp system. Advancing the normal shock forward increases the spillage of subsonic flow over the cowl lip. The amount of spillage (i.e., stability margin) available from the forward movement of the normal shock is limited by a flow instability phenomenon which causes the normal shock to oscillate severely. Adequate stability margin, therefore, may not be available.

A weakness of prior art two-dimensional supersonic inlets is associated with their sideplates and is characterized by a high degree of sensitivity to side flow, especially during supersonic flight conditions. Cut-back sideplates have been used in the past to alleviate this problem. Such cut-back sideplates tend to increase the stability margin by providing increased flow area through which subsonic spillage can occur. Unfortunately, however, there is a penalty associated with this very simple solution to the inlet aerodynamic problems. That is, part of the flow compressed by the external ramps is spilled over the cut-back sideplates, thereby reducing the efficiency of the inlet system (i.e., increasing the size and drag and reducing the total pressure recovery of the inlet).

SUMMARY OF THE INVENTION

In accordance with the present invention, a new and improved supersonic inlet design is achieved which permits usage of full sideplates for high efficiency while providing both boundary layer control and stability margin as required.

The invention is characterized by full sideplates having variable area slots located slightly upstream of the lower inlet lip. These slots provide boundary layer control for the normal shock-boundary layer interaction during on-design operation and provide an increasing flow area for spillage as the normal shock is moved forward during off-design operation. The variable area feature of the slots is preferably obtained through remotely-controlled actuators, spring-loaded doors, or other similar devices.

The above and other objects and features of the invention will become apparent from the following detailed description taken in connection with the accompanying drawings which form a part of this specification, and in which:

FIG. 1 is a cross-sectional side view of a supersonic inlet incorporating the variable area sideplate slots of the invention;

FIG. 2 is a perspective bottom view of the supersonic inlet shown in FIG. 1;

FIG. 3 is a cross-sectional view of the inlet of the invention taken substantially along line III—III of FIG. 1;

FIG. 4 is a cross-sectional view taken substantially along line IV—IV of FIG. 3;

FIG. 5 is a plot graphically illustrating the boundary layer conditions adjacent the normal shock produced in the inlet of the invention; and FIG. 6 is a view takn along line VI—VI of FIG. 2 and illustrating the details of one embodiment of the variable area sideplates of the invention.

With reference now to the drawings, and particularly to FIGS. 1-4, the supersonic inlet shown comprises a forward, generally rectangular housing 10 having a top wall 12 (FIG. 3), side walls or sideplates 14 and 16 and a lower, removable cowl or wall 18. As shown, the top wall 12 extends beyond the cowl 18; while the sideplates 14 and 16 are tapered to define lower straight-line edges which extend from the forward edge of the top wall 12 to the forward edge of the cowl 18. In this respect, the sideplates 14 and 16 are full sideplates and not cut-away. Disposed within the rectangular inlet 10 are adjustable ramps 20 which can be moved from the full-line positions to the broken-line positions shown by suitable actuators, not shown. When the positions of the ramps 20 are varied, so also is the effective cross-sectional area presented to the incoming flow of air, this cross-sectional area and the position of the ramps being dependent upon the entering free stream Mach number. Generally speaking, as the Mach number of the entering stream increases, the distance between the ramps 20 and the cowl lip 18 decreases so as to provide a greater restriction to the entering air.

Behind the ramps 20 is a single ramp 22 which can move from the full-line to the broken-line position shown such that the forward end of the ramp 22 is immediately adjacent the trailing edge of the ramp 20 at all times. Beyond the ramp 22, the duct tapers into a circular configuration as shown in FIG. 4 such that the compressed air can flow into the intake of a jet engine, the nose cone of which is identified by the reference numeral 24 in FIGS. 1 and 4.

As was explained above, as the air enters the duct, shock waves are produced where the velocity of the entering air decreases abruptly while its pressure increases. These shock waves are produced along the ramp 20 with compression from the low supersonic Mach number to subsonic flow being obtained through a normal shock, schematically illustrated by the reference numeral 26 in FIG. 1. This normal shock occurs just upstream of the forward end of lip 18, as shown. This normal shock may move forward or aft depending upon the intake requirements of the jet engine and other factors. As the normal shock moves forwardly, for example, there is an increase of subsonic flow over the cowl lip 18. The amount of spillage which occurs from the forward movement of the normal shock is limited, however, by a flow instability phenomenon which causes the normal shock to oscillate severely.

In accordance with the present invention, the foregoing undesirable characteristics are obviated with the use of variable area slots in the sideplates 14 and 16 immediately upstream of the forward shock 26. As best shown in FIG. 5, each variable area slot comprises an opening 28 in the side wall 16, for example, which can be covered or exposed by means of a plate 30 pivotally connected to the sideplate 16 at 32. As shown in FIG. 6, the plate 30 can be spring-biased into closed position where it covers the slot 28 by means of coil springs 34 interposed between the plate and brackets 36 secured to the sideplate 16, for example. The plate 30 can be rotated outwardly to uncover the slot 28 in varying degrees by means of a cable 38 (FIG. 2) which passes around pulleys 40 and 42 and is connected to a lug 44 on the plate 30. It should be understood, however, that the cable arrangement shown is illustrative of only one of many different types of actuators which can be employed.

Reverting again to FIG. 5, the velocity profile of air passing along the inside surfaces of the sideplates 14 and 16 is indicated by the reference numeral 46 where velocity (V) is plotted against distance (D) from the surface of the sideplate. It will be noted that immediately adjacent the surface, the velocity of the airstream is lower than it is nearer the center of the duct. As a result, boundary layer separation is likely to occur at the normal shock. Such separation may cause engine stall. By providing the slots 28 in the side walls, however, boundary layer control is achieved during normal operation of the system. That is, a small opening of the slots 28 will allow part of the low-velocity air to flow through the slots 28, thereby tending to straighten out the velocity profile curve 46. Furthermore, when the normal shock 26 moves forward during off-design operation or for any other reason, the slots 28 provide an increased flow area for spillage as the normal shock moves forward. Consequently, with the use of the variable area slot arrangement, full sideplates 14 and 16 can be employed and need not be cut back as in prior art designs. This results in very little spillage of the compressed flow over the sideplates with a consequent increase in the efficiency of the inlet system. Since increased spillage from the normal shock can occur through the slots 28, the tendency of the normal shock to oscillate during off-normal conditions is materially reduced.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. An inlet duct for supersonic aircraft comprising an inlet channel having top and bottom walls and side walls, the top wall extending beyond the forward lip of the bottom wall and the lower edges of the side walls extending from the forward lip of the top wall to the forward lip of the bottom wall, the walls of the duct being arranged to produce a normal shock wave in close proximity to said forward lip of the bottom wall, variable area slot means located through said side walls upstream of said bottom wall forward lip and, during substantially all engine operations, upstream of said normal shock wave, and means for varying the area of said slot means to provide boundary layer control for controlling the normal shock-boundary layer interaction.

2. The inlet duct of claim 1 wherein said lower edges of the side walls define straight lines.

3. The inlet duct of claim 1 including ramp means within the duct for varying the cross-sectional area of the duct presented to an incoming airstream.

4. The inlet duct of claim 1 wherein said variable area slot means comprises a slot in each of said side walls.

5. The inlet duct of claim 1 wherein the forward end of said duct is generally rectangular in configuration and the downstream end of the duct is circular in configuration.

6. The inlet duct of claim 4 wherein said means for varying the area of each said slot comprises a plate pivotally connected to the side wall for each slot and adapted to cover the same, and means for selectively rotating the plate about its pivotal connection to the side wall to thereby vary the opening through which air can flow.

* * * * *